(12) United States Patent
Uyeda

(10) Patent No.: US 8,117,613 B2
(45) Date of Patent: Feb. 14, 2012

(54) OPTIMIZED VIRTUAL MACHINE MIGRATION MECHANISM

(75) Inventor: Lincoln K. Uyeda, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 415 days.

(21) Appl. No.: 12/420,082

(22) Filed: Apr. 8, 2009

(65) Prior Publication Data

US 2010/0262974 A1 Oct. 14, 2010

(51) Int. Cl.
*G06F 9/455* (2006.01)
(52) U.S. Cl. .......................................................... 718/1
(58) Field of Classification Search ........................ None
See application file for complete search history.

(56) References Cited

U.S. PATENT DOCUMENTS

| 7,925,923 | B1* | 4/2011 | Hyser et al. ...................... 714/13 |
| 2001/0049741 | A1* | 12/2001 | Skene et al. ..................... 709/232 |
| 2005/0060590 | A1 | 3/2005 | Bradley et al. |
| 2005/0251802 | A1 | 11/2005 | Bozek et al. |
| 2006/0069761 | A1 | 3/2006 | Singh et al. |
| 2006/0230407 | A1* | 10/2006 | Rosu et al. .................... 718/105 |
| 2007/0130566 | A1 | 6/2007 | Rietschote et al. |
| 2007/0180448 | A1* | 8/2007 | Low et al. .......................... 718/1 |
| 2008/0104608 | A1* | 5/2008 | Hyser et al. .................... 718/105 |
| 2008/0141264 | A1* | 6/2008 | Johnson ......................... 718/105 |
| 2008/0163239 | A1* | 7/2008 | Sugumar et al. .............. 718/105 |
| 2008/0222375 | A1* | 9/2008 | Kotsovinos et al. .......... 711/162 |
| 2009/0172666 | A1* | 7/2009 | Yahalom et al. ................... 718/1 |
| 2010/0042719 | A1* | 2/2010 | Kinoshita ....................... 709/225 |
| 2010/0138475 | A1* | 6/2010 | Frank et al. .................... 709/203 |
| 2011/0029973 | A1* | 2/2011 | Hara et al. ........................ 718/1 |

OTHER PUBLICATIONS

"International Search Report", Mailed Date: Oct. 29, 2010, Application No. PCT/US2010/029714, Filed Date: Apr. 1, 2010, pp. 8.

* cited by examiner

*Primary Examiner* — Idriss N Alrobaye
(74) *Attorney, Agent, or Firm* — Russell S. Krajec; Krajec Patent Offices, LLC

(57) ABSTRACT

A virtual machine management system may perform a three phase migration analysis to move virtual machines off of less efficient hosts to more efficient hosts. In many cases, the migration may allow inefficient host devices to be powered down and may reduce overall energy costs to a datacenter or other user. The migration analysis may involve performing a first consolidation, a load balancing, and a second consolidation when consolidating virtual machines and freeing host devices. The migration analysis may also involve performing a first load balancing, a consolidation, and a second load balancing when expanding capacity.

17 Claims, 6 Drawing Sheets

OPTIMIZED VIRTUAL MACHINE MIGRATION MECHANISM

BACKGROUND

Virtual machines are computer software implementations of a computer device, where the virtual machine may execute programs like a physical computer. Virtual machines are widely used in data centers where hundreds or thousands of host machines may be operating. In order to manage the computing resources, many data centers run server computers as virtual machines because virtual machines can be moved from one host device to another.

Many data centers operate on a cyclical basis, where demand may be higher during certain periods of the day or certain days of the week. During low demand times, virtual machines may be consolidated to certain host machines so that other host machines may be turned off or operated in a reduced power mode.

In many cases, a datacenter may consume large amounts of electricity. As hardware is turned off during periods of reduced computer load, the datacenter may reduce its electricity costs substantially.

The process of placing virtual machines onto host devices may be a complex packing problem.

SUMMARY

A virtual machine management system may perform a three phase migration analysis to move virtual machines off of less efficient hosts to more efficient hosts. In many cases, the migration may allow inefficient host devices to be powered down and may reduce overall energy costs to a datacenter or other user. The migration analysis may involve performing a first consolidation, a load balancing, and a second consolidation when consolidating virtual machines and freeing host devices. The migration analysis may also involve performing a first load balancing, a consolidation, and a second load balancing when expanding capacity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
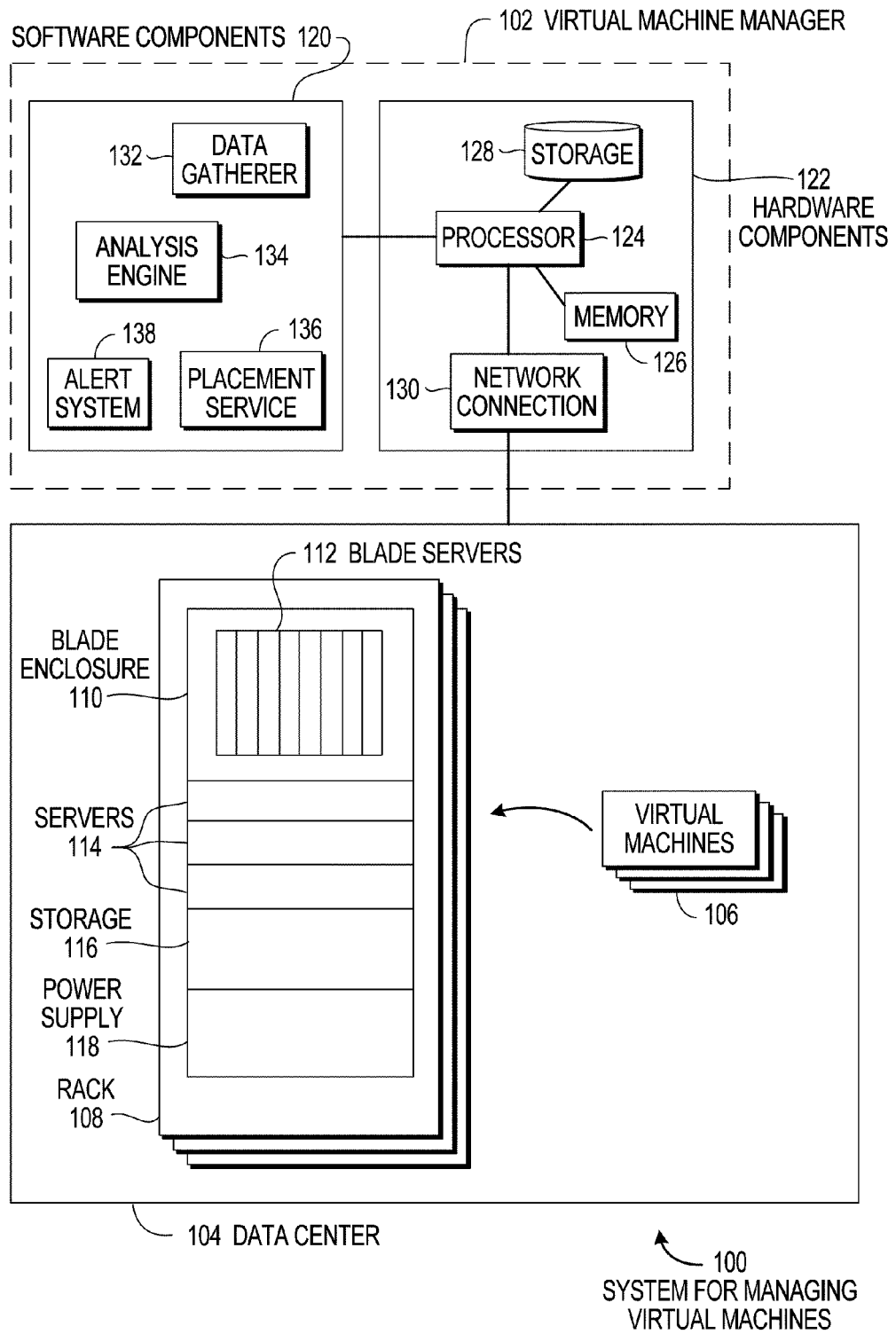
FIG. 1 is a diagram illustration of an embodiment showing a system for managing virtual machines.

An efficiency driven optimization process may perform a three phase migration analysis for expanding or contracting capacity in a datacenter or other group of host devices for virtual machines. In many cases, the three phase migration analysis for consolidating or load balancing virtual machines may cause virtual machines to be moved from inefficient host devices to more efficient host devices, and may involve turning on a more efficient host device and turning off an inefficient device.

The three phase migration analysis may involve gathering data from which efficiency scores for host devices may be determined. The efficiency scores may be used to identify candidates for powering down, and virtual machines on said candidates may be attempted to be moved to other hosts in a first consolidation process. During the first consolidation process, a high threshold may be used to place virtual machines.

In a second phase of a consolidation process, a load balancing operation may be performed for those host devices that are overloaded. In some cases, the load balancing operation may result in one or more hosts being powered on to accept some of the virtual machines. The newly powered on hosts may be selected from the more efficient hosts.

In a third phase of the consolidation process, a second consolidation operation may be performed to identify any potentially underutilized host devices. In the second consolidation operation, a lower threshold may be used to place virtual machines so that host devices are not overloaded.

A load balancing operation may operate in a similar manner as the consolidation operation. In the first step of a load balancing operation, a low threshold for identifying host devices on which virtual machines may be placed. Any new host devices may be selected from the most efficient host devices. The second step may be a consolidation step, and a third step may be a second load balancing operation with a higher threshold.

The optimization process may take into account the current state of virtual machines on the host device and may minimize virtual machine movements or thrashing. Further, the optimization process may favor moving virtual machines from inefficient host devices to more efficient host devices.

Throughout this specification and claims, the term 'host' is used to describe a physical hardware platform on which a virtual machine may be executed. In some embodiments, a lightweight operating system may run on the host and may support one, two, or many more virtual machines. In some embodiments, many tens or even hundreds of virtual machines may be executed on one physical host device.

The term 'host' may be any type of hardware platform on which a virtual machine may be executed. In some cases, the hardware platform may be a server computer with specialized processors, memory, disk storage, and network connections that are specifically designed to run virtual machines. In other cases, the host may be a conventional desktop or server computer, or may be a portable device such as a mobile phone, laptop computer, or other device. For the purposes of this specification, many examples may involve datacenter applications, however, those skilled in the art will appreciate that many other implementations may be possible.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, resources, data structures, etc. that perform particular tasks or implement particular abstract data types. Typically, the functionality of the program modules may be combined or distributed as desired in various embodiments.

FIG. 1 is a diagram of an embodiment 100 showing a system for managing virtual machines. Embodiment 100 is a simplified example of a system that may manage virtual machines on several host devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a datacenter that may contain many host devices, each of which may execute multiple virtual machines. Virtual machines may be a software version of a device. In a large datacenter environment, server computers may be implemented as virtual machines. As demand shrinks, virtual machines may be consolidated onto some host devices so that other hosts may be powered down or operated in a reduced energy state. As demand rises, hosts may be brought online and virtual machines may be spread among the available hosts. The process of spreading the virtual machines to available hosts may be known as load balancing.

As the overall load of a datacenter diminishes, some host devices may become underutilized. Underutilized hosts may be consolidated by having the virtual machines on the host moved to other hosts, then the host may be powered off. Typically, a consolidation action may occur when several host devices become less than fully utilized.

When selecting a host to consolidate, an inefficient host may be selected, regardless of the utilization of the host. Once the virtual machines on the selected host are moved off of the host, the host may be powered down or operated in a reduced power mode.

As the overall load of a datacenter increases, some hosts may become overloaded. Overloaded hosts may be load balanced by moving virtual machines from the overloaded host to other operating hosts that are not overloaded. In some cases, no other operating hosts may be capable of accepting a virtual machine without being overloaded itself. In such a case, a new host may be identified to be turned on and a virtual machine may be moved to the new host.

When selecting a host to turn on during load balancing, an efficient host may be selected.

The efficiency of a host may be determined by a resource supplied by the host divided by the power consumed. In many embodiments, the resource may be CPU capacity, although other embodiments may use different resources.

In many cases, hosts may have different capabilities and different capacities. The resources available on a host may be categorized into consumable and non-consumable resources.

A consumable resource is one that is consumed by a virtual machine and cannot be shared with other virtual machines or a host operating system. An example of a consumable resource may be random access memory (RAM). Each virtual machine may have a dedicated amount of RAM assigned to the virtual machine, and that RAM may not be used by other virtual machines. Another example may be disk space or other storage.

In some cases, a consumable resource may be considered as a summation of various component resources. For example, a hard disk resource may be considered the summation of disk read speed, disk write speed, and capacity.

A non-consumable resource may be a resource that can be shared by virtual machines or by a host operating system. An example may be a number of processors available on a host device. Some virtual machines may operate using two, four, or more processors or cores. Even though a virtual machine uses four processors, other virtual machines or the host operating system may also use the same processors.

A binary resource may be a subset of a non-consumable resource. A binary resource may be a resource that is either present or not on a host. For example, a host may or may not have a graphics processor or other feature that may be used by a particular virtual machine.

The various resources may be discussed in this specification as dimensions for consideration when placing virtual machines onto hosts. The term 'dimensions' is intended to include resources or any other factor that may be considered when evaluating the efficiency of a host. In some cases, a dimension may not correspond to a resource available on a host or used by a virtual machine.

In a datacenter 104, a rack 108 may contain multiple host devices. A typical datacenter may have racks with blade enclosures 110 that may include multiple blade servers 112. Some racks may include standalone servers 114, storage devices 116, and power supplies 118. In many cases, a rack or group of racks may have cooling systems, power conditioning units, uninterruptible power supplies, and other components. In a large datacenter, many hundreds or even thousands of racks may be present, many of which may have different configurations.

Many resources may be shared across several host devices. When the resources are shared, the 'cost' or power usage of the resources may be divided over multiple hosts, and the hosts may be very efficient. When very few hosts share the resource, the host may become much more inefficient. Hosts may become inefficient when other host are powered off, leaving the few running hosts to consume an otherwise shared resource.

Using the datacenter as an example, a rack of equipment may have devices that provide services to an entire rack, such as power supplies, cooling, or other services. Even if one server is operational in the rack, the rack based services may be turned on. In such a case, the single server or host device may be quite inefficient as the power consumption of the rack based power supplies, rack cooling, or other services are not shared across multiple host devices.

In another example, a blade enclosure may provide power, network access, cooling, or other services to multiple blades. A blade enclosure may be fully operational even to support a single blade server operational in the enclosure. In such a case, the power consumption of the blade enclosure may be attributed to the operating host device, making the host inefficient.

When consolidating virtual machines within a datacenter, inefficient hosts may be identified for shutting down by moving virtual machines to other devices. When load balancing, efficient hosts may be considered for bringing online and receiving virtual machines.

The efficiency of a host may be determined by dividing a resource provided by the host by the power consumed by the host. The power consumed by a host may be approximated as the power consumed by shared devices divided by the number of hosts that are using the shared devices. In the example above of a blade enclosure, the power consumed by the blade enclosure may be divided among the blade servers operating in the enclosure. If the blade enclosure has ten servers and all ten are operating, the power consumed by the blade enclosure may be divided by ten and attributed to each host. If the same blade enclosure has only one operating server, the entire power consumed by the blade enclosure can be attributed to the server.

In many embodiments, the efficiency of a host may be expressed by measuring a resource by the power consumed by the host. A typical embodiment may divide CPU capacity by power consumed. The power consumed by the host may include any consumption attributed to the host by shared devices, such as shared power supplies, shared cooling resources, or other shared devices.

In other embodiments, the efficiency of a host may be expressed by measuring other resources, such as disk capacity, network capacity, or other resources and dividing by power consumption. Some embodiments may analyze the resources to identify a scarce resource for determining an efficiency. In such cases, the resource may change from one analysis to another.

In some embodiments, many placement scenarios may be simulated and analyzed to identify a preferred scenario. In such an embodiment, many thousands or millions of scenarios may be simulated and a score may be assigned to the scenarios. The score may be used to select a preferred scenario that may be implemented.

Embodiment 100 is an example of a system for managing virtual machines in a datacenter environment. The virtual machine manager 102 may be a device that organizes a datacenter 104, where multiple virtual machines 106 may be executed by various host devices.

The virtual machine manager 102 may be an application that operates on a hardware platform. The virtual machine manager 102 may be comprised of software components 120 that operate on hardware components 122. The hardware components 122 may include a processor, random access memory 126, disk or other storage 128, and a network connection 130. In some embodiments, some or all of the hardware components 122 may be virtualized.

The virtual machine manager 102 may have software components 120 that include a data gatherer 132, an analysis engine 134, a placement service 136, and an alert system. The data gatherer 132 may collect status of various dimensions from host devices and virtual machines. The analysis engine 134 may determine a placement for a set of virtual machines on the hosts, and the placement service 136 may move the virtual machines to the designated hosts. The alert system 138 may identify conditions when a consolidation or load balancing operation may be performed.

The data gatherer 132 may collect data on dimensions or resources supplied by hosts and demanded by virtual machines. The supply and demand information may be used to determine scarcity of the various dimensions, which may in turn be used by the placement manager 134 to determine various placements for virtual machines onto hosts.

The analysis engine 134 may evaluate many different placement configurations. Each placement configuration may be a set of specific virtual machines that are executed on a specific host device. In some embodiments, many thousands, millions, or more placement configurations may be evaluated. For each placement configuration, a score may be computed for an optimizing parameter. For example, each configuration may have a power consumption score from which an optimized configuration may be selected.

Figure 2:
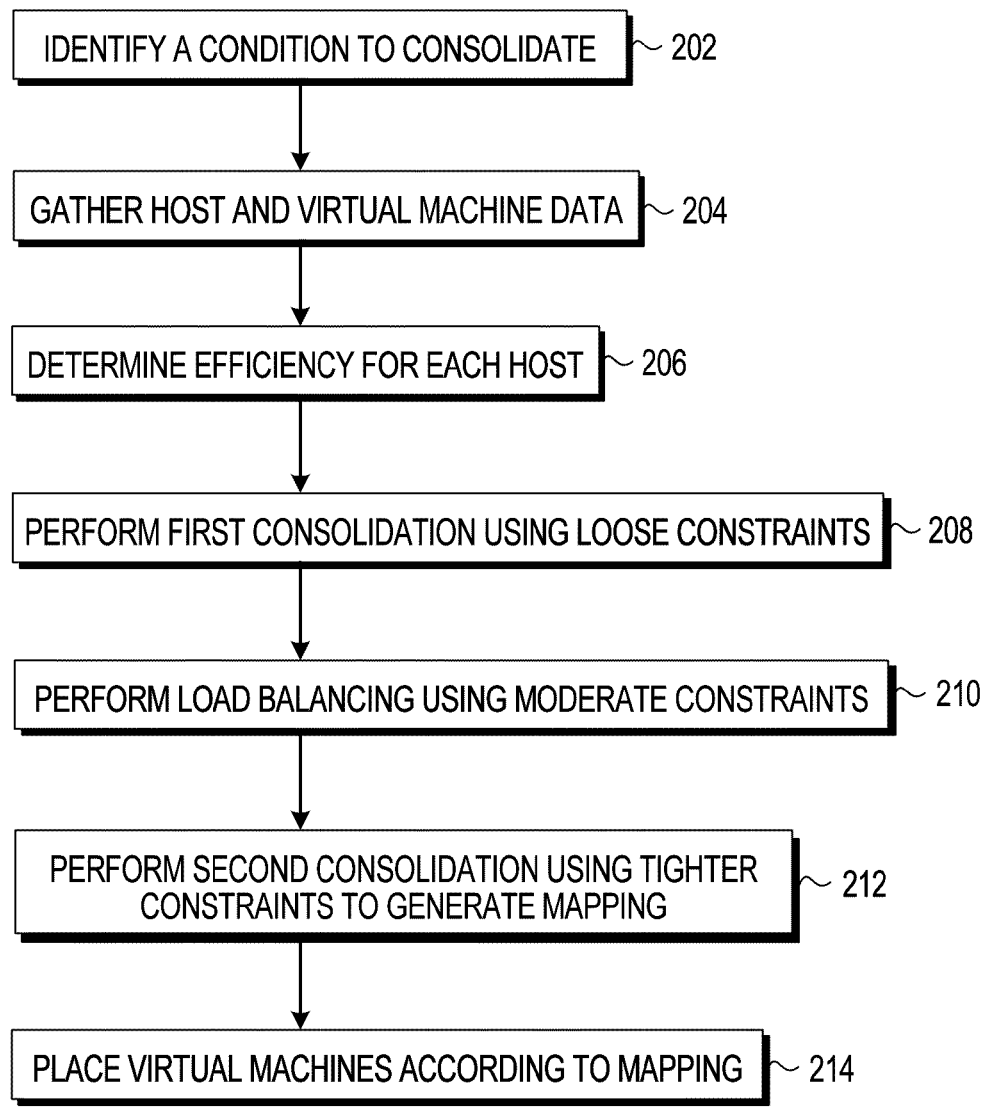
FIG. 2 is a flowchart illustration of an embodiment showing a method for performing consolidation.

FIG. 2 is a flowchart illustration of an embodiment 200 showing a method for performing consolidation of virtual machines. Embodiment 200 is a simplified example of a method that may be performed by a virtual machine manager 102 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates one method for performing a consolidation routine. Consolidation may be triggered when one or more host devices becomes underutilized, and the process may move virtual machines from the host device to other devices.

In many cases, consolidation process may allow one or more host devices to be powered down. Typically, consolidation may occur when the overall load of a datacenter is reduced, and in many cases, several host devices may become underutilized. Underutilization may occur when one or more virtual machines operating on the host are consuming fewer host resources, leaving much of the host resources unused.

The consolidation process may perform a first consolidation operation using loose constraints, then perform a load balancing operation using moderate constraints, and then perform a second consolidation operation using tighter constraints.

The constraints may be thresholds or other parameters that indicate a host's capacity. For example, a datacenter may typically operate hosts at an 80% capacity. By selecting an 80% capacity factor, the host may be able to respond to load fluctuations without being over capacity.

Different datacenters may establish different constraints based on many different factors. In cases where datacenter loads may be fairly constant and predictable, a typical capacity factor may be higher, such as 85%, 90%, or even higher. In some cases, datacenter loads may be volatile, leading an administrator to use a lower capacity factor, such as 75%, 70%, 60%, or even lower.

In some embodiments, the capacity factor may be changed due to the time of day or other factors. For example, a datacenter that sees high loads during the workday hours may operate at a lower capacity factor so that the datacenter remains responsive. The same datacenter may be operated with higher capacity factors overnight so that more host devices may be powered off and when the load on the datacenter is more predictable and steady.

In the embodiment 200, a first consolidation may be performed with loose constraints. In such an operation, virtual machines may be moved from inefficient devices to more efficient devices such that the efficient devices may be overloaded. The load balancing operation may move virtual machines from overloaded devices to other devices or may involve turning on one or more devices that may receive virtual machines. When the load balancing operation is performed, devices that are turned on may be selected from the more efficient devices.

A second consolidation operation may be performed using tighter constraints, which may cause some host devices to be unloaded and powered down, but the constraints may be selected so that an overloaded condition may not occur on other devices.

The three phase method of embodiment 200 may result in inefficient host devices being powered down and more efficient hosts being started up. In a typical process, several inefficient host devices may be powered down and a much smaller number of more efficient host devices may be powered up.

Embodiment 200 begins in block 202 by identifying a condition to consolidate. Different embodiments may have different mechanisms for identifying a condition to consolidate. In some embodiments, a monitoring system may receive alerts from host devices that fall below some threshold of capacity. For example, a host device that falls below 20% utilization of its resources may send an alert to a centralized monitoring system, such as the alert system 138 of embodiment 100.

Different embodiments may have a lower limit of utilization that may identify underutilized hosts. In the example above, a 20% utilization factor is used. Some embodiments may use a 50%, 40%, 30%, 25%, 15%, 10% or other factors for a lower limit of utilization. As discussed above for the upper limit of utilization, the lower limit of utilization may vary during the course of a day, day or the week, or other seasonal or periodic basis.

In some embodiments, a single host device becoming underutilized may trigger the consolidation operation of embodiment 200. In other embodiments, alerts from a certain number of devices may be used to trigger a consolidation operation.

In some embodiments, a condition for consolidation may occur when the overall load of a datacenter is significantly less than the current capacity of the datacenter. Such an embodiment may perform a consolidation based on datacenter-wide capacity and load parameters in addition to or in lieu of data for individual host devices.

In block 204, host and virtual machine data may be gathered. An example of a method for gathering such data may be illustrated in embodiment 400. The data gathered for each host and virtual machine may be data that may be used to identify resource usage as well as power usage. In some embodiments, a scarce resource may be identified and used to calculate the efficiency of host devices.

In block 206, the power efficiency of host devices may be determined. The efficiency of a host device may be determined by dividing a resource by the power consumed for the host. In a simple example using CPU as a resource, a host's efficiency may be measured in CPU capacity divided by watts consumed.

In block 208, a first consolidation may be performed using loose constraints. An example of a consolidation method may be illustrated in embodiment 500 illustrated later in this specification. The consolidation method may identify inefficient host devices and attempt to move the virtual machines from inefficient host devices to other, more efficient host devices.

The first consolidation of block 208 may be performed with loose constraints. A loose constraint may be one in which hosts may be loaded with virtual machines beyond their intended capacity. For example, when packing virtual machines onto a host, the recipient host may be packed with virtual machines that exceed a desired 80% capacity. In some cases, the loose constraints may allow a recipient host to exceed 90%, 100%, 110%, or even higher capacity.

The consolidation of block 208 may be performed as a simulated consolidation and without moving any virtual machines. Throughout the embodiment 200, simulated actions may be performed to generate a mapping of virtual machines to host devices. After the mapping is determined, the virtual machines may be moved according to the mapping.

The constraints used in block 208 may be two types of constraints. The first constraint may be an upper capacity limit for hosts that receive virtual machines, as described above. The second constraint may be a lower capacity limit for those host devices that are being considered for powering down. A loose constraint may consider a larger set of host devices for powering down than a tight constraint.

For example, a loose constraint may consider hosts with 30% or lower capacity for powering down. A tight constraint may consider only hosts with 10% or lower capacity for powering down, which may be a much smaller set of host devices.

After consolidation of block 208, a first intermediate mapping may be created. The first mapping may be used in block 210 to perform a simulated load balancing using moderate constraints. An example of a simulated load balancing process may be illustrated in embodiment 600 presented later in this specification.

In the simulated load balancing, hosts that exceed a capacity limit may be examined to move some virtual machines from the host to other hosts. In cases where no host can accept a virtual machine, a new host may be powered on and may receive the virtual machine.

During a load balancing operation, new hosts may be selected from the more efficient host devices. In many cases, a sorted list of host devices may be created based on efficiency, and the most efficient hosts may be selected from the top of the list.

In many embodiments, the moderate constraints of block 210 may be the typical operating constraints or target constraints for a datacenter. In some embodiments, the moderate constraints of block 210 may be tighter or looser than the target constraints for the datacenter.

The load balancing of block 210 may produce a second mapping of virtual machines to hosts. The second mapping may be used in block 212 to perform a second consolidation using tighter constraints and a final mapping.

The second consolidation of block 212 may be a similar operation to block 208, but performed with a different set of constraints. In block 212, a tighter set of constraints may be considered. In block 212, devices with a more restrictive lower capacity limit may be considered for powering off, and the virtual machines may be moved to hosts with a more restrictive upper capacity limit.

In some embodiments, the second consolidation of block 212 may be performed using the same upper limit constraints as used in block 210 for the load balancing, but with tighter lower limit constraints.

After the second consolidation is performed in block 212, a mapping may be generated. The mapping may be used in block 214 to actually move some of the virtual machines to new locations and power off some host devices.

The analysis of blocks 204 through 212 may be performed many times to generate many different mappings in some embodiments. Some embodiments may perform simulations that generate thousands or more mappings, each of which may be scored. One of the mappings may be selected and implemented in block 214.

The process of embodiment 200 may produce a consolidated mapping that maximizes the efficiency of the hosts. Low efficiency hosts may be powered off and, if new hosts are turned on, the new hosts may be more efficient hosts.

The process of embodiment 200 allows the first consolidation to occur with loose constraints. The first consolidation may allow some hosts to become over capacity, but may maximize the number of inefficient hosts that may be powered down. The load balancing operation may transfer some of the load from the over capacity host devices to other hosts, including one or more efficient hosts that may be turned on to receive the capacity. The second consolidation operation may further consolidate if one or more hosts are very lightly loaded, but without overloading other hosts.

The consolidation operations of blocks 208 and 212 may attempt to unload and power off host devices based on the host's efficiency, which may not correspond to the host's current capacity. In some cases, such hosts may be operating at or above capacity. The consolidation operation may cause inefficient hosts to be powered off while moving virtual machines to other, more efficient hosts. The net result may be a considerable power savings.

The consolidation process of embodiment 200 may result in some hosts being turned on. In such a case, the hosts that are turned on may be more efficient than the hosts that are powered down. In a typical case, fewer hosts may be turned on than those that are turned off.

Figure 3:
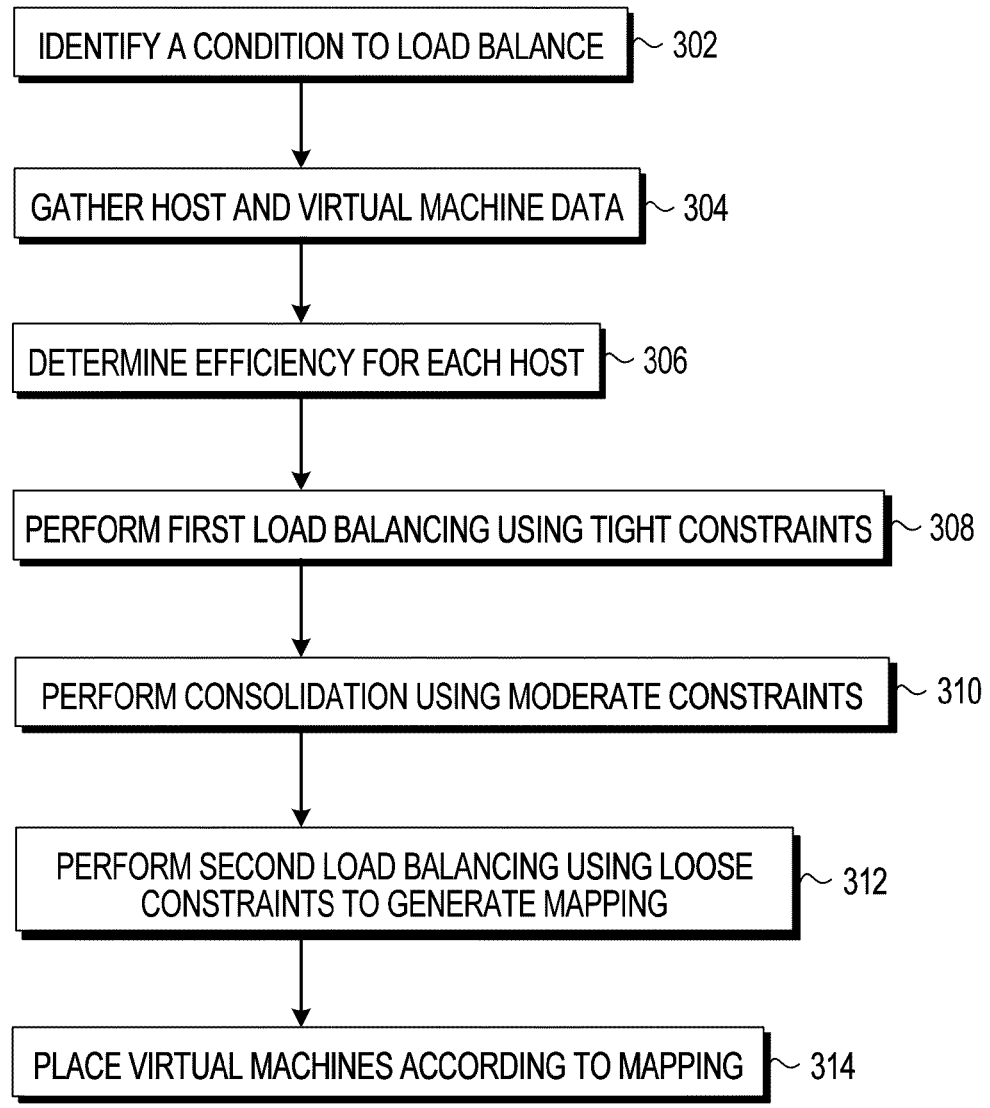
FIG. 3 is a flowchart illustration of an embodiment showing a method for performing load balancing.

FIG. 3 is a flowchart illustration of an embodiment 300 showing a method for performing load balancing of virtual machines. Embodiment 300 is a simplified example of a method that may be performed by a virtual machine manager 102 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is conceptually similar to the process of embodiment 200, but performs a load balancing operation rather than a consolidation operation. Embodiment 300 performs a first load balancing process with tight constraints, a consolidation operation with moderate constraints, and a second load balancing operation with loose constraints.

Embodiment 300 attempts to spread out a large number of virtual machines in the first load balancing operation by using tight constraints. This operation may spread virtual machines to a large number of host devices, and may cause one or more efficient host devices to be turned on. The subsequent consolidation operation may attempt to turn off the more inefficient devices, and the second load balancing operation may clean up any overloaded devices.

The net result of embodiment 300 is that the load balancing operation may be performed while favoring efficient host devices over less efficient host devices. In some operations, currently operating hosts that are inefficient may be turned off during the consolidation operation, and the efficient hosts that are turned on during the first load balancing operation may remain operating. In such a case, a load balancing operation may result in some host devices being powered off.

The consolidation operations may attempt to unload host devices based on the host's efficiency, which may not correspond to the host's current capacity. In some cases, such hosts may be operating at or above capacity. The consolidation operation may cause inefficient hosts to be powered off while moving virtual machines to other, more efficient hosts.

The load balancing operations may attempt to move virtual machines across host devices that are already powered on. However, if there is no capacity in the currently powered on hosts, a new host may be powered on and brought on line. Any new host that is powered on may be selected from the more efficient hosts.

Embodiment 300 begins in block 302 by identifying a condition to load balance. Different embodiments may have different mechanisms for identifying a condition to load balance. In some embodiments, a monitoring system may receive alerts from host devices that exceed some threshold of capacity. For example, a host device that exceeds 80% utilization of its resources may send an alert to a centralized monitoring system, such as the alert system 138 of embodiment 100.

In some embodiments, a single host device becoming over utilized may trigger the load balancing operation of embodiment 300. In other embodiments, alerts from a certain number of devices may be used to trigger a load balancing operation.

In some embodiments, a condition for load balancing may occur when the overall load of a datacenter is significantly greater than the desired capacity of the datacenter. Such an embodiment may perform a load balancing based on datacenter-wide capacity and load parameters in addition to or in lieu of data for individual host devices.

In block 304, host and virtual machine data may be gathered. An example of a method for gathering such data may be illustrated in embodiment 400. The data gathered for each host and virtual machine may be data that may be used to identify resource usage as well as power usage. In some embodiments, a scarce resource may be identified and used to calculate the efficiency of host devices.

In block 306, the power efficiency of host devices may be determined. The efficiency of a host device may be determined by dividing a resource by the power consumed for the host. In a simple example using CPU as a resource, a host's efficiency may be measured in CPU processor capacity divided by watts consumed.

In block 308, a first load balancing operation may be performed using tight constraints. An example of a load balancing method may be illustrated in embodiment 600 illustrated later in this specification. The load balancing method may push virtual machines from heavily loaded devices to lightly loaded devices. In some cases, a new host may be powered on to accept some of the virtual machines. In such a case, the new host may be selected from a sorted list of efficient hosts.

The first load balancing of block 308 may be performed with tight constraints. A tight constraint may be one in which hosts may be unloaded down to a limit lower than their desired capacity. For example, when moving virtual machines from a host, the host may be unloaded until the capacity is some capacity less than a desired capacity. For example, a desired capacity may be 80% but the tight constraint of block 308 may be set so that the host devices are unloaded to less than 60% capacity.

The load balancing of block 308 may be performed as a simulated load balancing and without actually moving virtual machines. Throughout the embodiment 300, simulated actions may be performed to generate a mapping of virtual machines to host devices. After the mapping is determined, the virtual machines may be moved according to the mapping.

After load balancing of block 308, a first intermediate mapping may be created. The first mapping may be used in block 310 to perform a simulated consolidation using moderate constraints. An example of a simulated consolidation process may be illustrated in embodiment 600 presented later in this specification.

In the simulated consolidation of block 310, hosts that fall below a capacity limit may be examined to move some virtual machines from the host to other hosts. When no further hosts can be consolidated and powered off, the consolidation operation may stop.

The constraints used in block 310 may be two types of constraints. The first constraint may be an upper capacity limit for hosts that receive virtual machines, as described above. The second constraint may be a lower capacity limit for those host devices that are being considered for powering down. A loose constraint may consider a larger set of host devices for powering down than a tight constraint.

For example, a loose constraint may consider hosts with 30% or lower capacity for powering down. A tight constraint may consider only hosts with 10% or lower capacity for powering down, which may be a much smaller set of host devices. During a load balancing operation, new hosts may be selected from the more efficient host devices. In many cases, a sorted list of host devices may be created based on efficiency, and the most efficient hosts may be selected from the top of the list.

In many embodiments, the moderate constraints of block 310 may be the typical operating constraints or target constraints for a datacenter. In some embodiments, the moderate constraints of block 310 may be tighter or looser than the target constraints for the datacenter.

The consolidation of block 310 may produce a second mapping of virtual machines to hosts. The second mapping may be used in block 312 to perform a second load balancing using loose constraints and a final mapping.

The second load balancing of block 312 may be a similar operation to block 308, but performed with a different set of constraints. In block 312, a loose set of constraints may be considered. In block 312, load balancing may occur for those devices that have higher usage than may be typically desired. In many cases, the load balancing operation of embodiment 300 may be performed when a data center is experiencing a rise in demand. As such, the load balancing of block 312 may be performed such that each host is being utilized somewhat less than a target utilization because the load on the datacenter may be expected to rise.

In some embodiments, the second load balancing of block 312 may be performed using the same upper limit constraints as used in block 310 for the consolidation.

After the second consolidation is performed in block 312, a mapping may be generated. The mapping may be used in block 314 to actually move some of the virtual machines to new locations and power off some host devices.

The analysis of blocks 304 through 312 may be performed many times to generate many different mappings in some embodiments. Some embodiments may perform simulations that generate thousands or more mappings, each of which may be scored. One of the mappings may be selected and implemented in block 314.

The process of embodiment 300 may produce a consolidated mapping that maximizes the efficiency of the hosts. Low efficiency hosts may be powered off and, if new hosts are turned on, the new hosts may be more efficient hosts.

The process of embodiment 300 allows the first load balancing to occur with tight constraints. The first load balancing may force virtual machines to new hosts that may be powered on. The consolidation operation may attempt to unload the inefficient hosts. The second load balancing operation may spread the virtual machines across the remaining hosts.

The load balancing process of embodiment 300 may result in some hosts being powered down. In such a case, the hosts that are turned on may be more efficient than the hosts that are powered down. In a typical case, more hosts may be turned on than those that are turned off.

Figure 4:
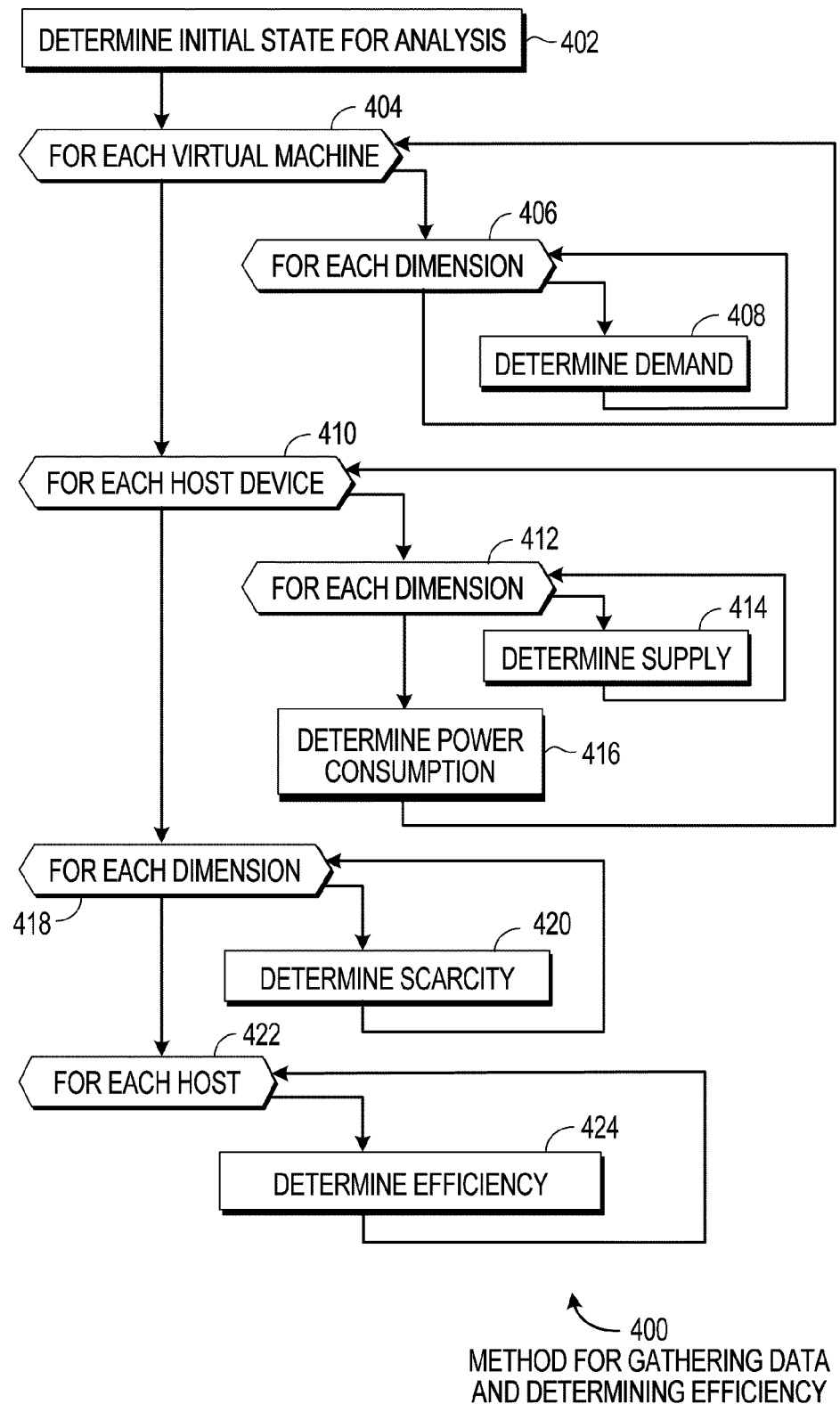
FIG. 4 is a flowchart illustration of an embodiment showing a method for gathering data and determining efficiency.

FIG. 4 is a flowchart illustration of an embodiment 400 showing a method for gathering supply and demand data. Embodiment 400 is a simplified example of a method that may be performed by a data gatherer 132 as illustrated in embodiment 100 and by block 204 in embodiment 200 and by block 304 in embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one method by which supply and demand data may be gathered. Supply data may relate to resources or other dimensions that are found on host devices, while demand data may relate to matching resources or dimensions that are used by virtual machines. After gathering data, scarcity is determined and a scarcity score may be determined for each host device. The efficiency of each host may also be determined.

Embodiment 400 may be performed on a set of host devices with different initial states. In one scenario, the host devices may be analyzed as if no virtual machines are currently running. In such a scenario, an optimized placement of virtual machines over an entire datacenter may be identified. In another scenario, a consolidation or load balancing may be performed with some other set of initial conditions.

In block 402, the initial state for analysis is determined.

In blocks 404 through 408, the demand is determined for each dimension of each virtual machine. In block 404, each virtual machine is analyzed. For each dimension in block 406, a demand for the dimension is determined in block 408.

The dimensions analyzed may vary between embodiments. In many cases, the dimensions may include consumed resources, non-consumed resources, and binary resources as well as other dimensions.

For each host device in block 410, each dimension is analyzed in block 412. The supply for the dimension is determined in block 414.

A power consumption may be determined in block 416. The power consumption of block 416 may include the power consumed by the host itself, along with the host's share of devices that may be shared with other hosts. For example, power supplies, cooling systems, and other devices may be shared between hosts. In cases where very few hosts are sharing the devices, the power consumption of the shared devices may be attributed to only those few hosts. In many cases, the efficiency of the host may be decreased significantly when other hosts that share a device are not powered on.

In a simple example, a rack of servers may contain fifty servers and may have cooling systems and power supplies that are shared among the fifty servers when the servers are all running. When forty nine of the servers are turned off and one server is operational, the single running server may be attributed all of the power for the rack cooling and power supply. Such a server may be very inefficient, compared to a case when all fifty servers are operational and share the power costs of the cooling system and power supplies.

For each dimension in block 416, a scarcity is determined in block 418.

Scarcity may be determined through the following formula:

$$Scarcity_{dim} = \frac{\sum_{VM} demand_{dim}}{\left(\sum_{host} supply_{dim} - \sum_{VM} demand_{dim}\right)}$$

For each dimension, scarcity may be computed by dividing the sum of all virtual machine demand by the difference between the sum of all host supply and the sum of all virtual machine demand. Scarcity is a dimensionless number for each dimension. A high scarcity value indicates that the dimension is scarce, while a low scarcity value indicates that the dimension is plentiful.

In block 420, each host is analyzed. In block 422, an efficiency for the host is determined. The efficiency may be calculated by dividing the selected resource by the consumed power attributed to the host. In some embodiments, a scarce resource may be used as the selected resource. The scarce resource may be that resource which has the highest scarcity factor as determined in the above equation.

In some embodiments, the efficiency of block 422 may be determined using a predefined resource, such as CPU capacity, disk capacity, or some other resource. In embodiments where a scarce resource is used, the resource may change from one analysis to another.

Figure 5:
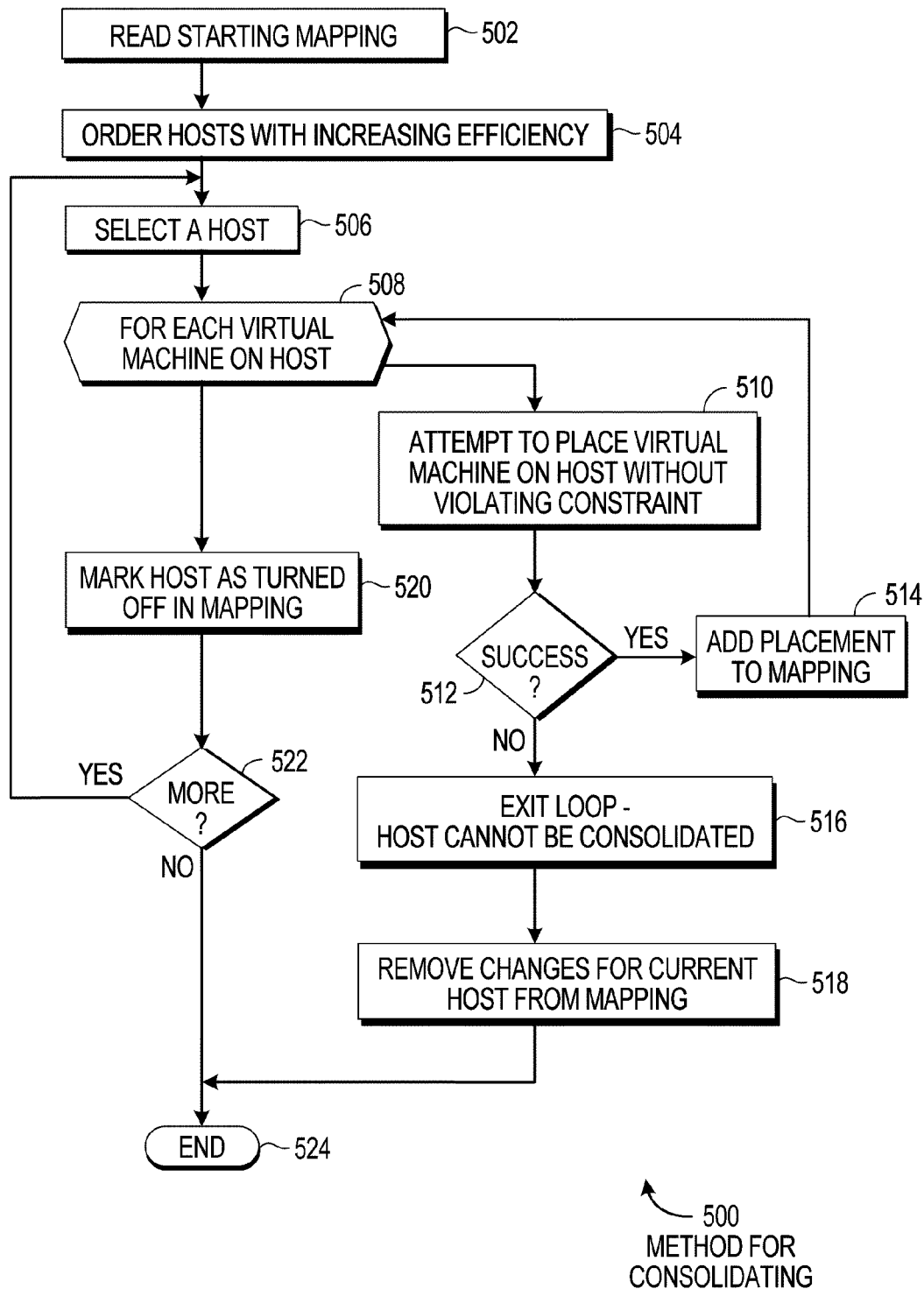
FIG. 5 is a flowchart illustration of an embodiment showing a method for consolidating.

FIG. 5 is a flowchart illustration of an embodiment 500 showing a method for consolidating. Embodiment 500 is a simplified example of a method that may be performed by the consolidation operations of blocks 208 and 212 of embodiment 200, as well as block 310 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The operation of embodiment 500 may attempt to place all of the virtual machines from one host to other hosts. When all of the virtual machines are transferred, the host may be turned off. Embodiment 500 may perform the operation for many hosts until the capacity of the recipient hosts is met, at which point the process may end.

Embodiment 500 attempts to power off hosts by processing hosts in order of efficiency, starting with the least efficient hosts first. In some cases, the least efficient hosts may be hosts that are at or over the host's capacity limit.

The starting mapping may be read in block 502. The hosts may be ordered in increasing efficiency in block 504, and a host may be selected in block 506. The host selected in block 506 may be the most inefficient host based on the list in block 504.

For each virtual machine on the host in block 508, an attempt to place the virtual machine may be made on other hosts without violating an upper limit constraint on the recipient host in block 510. For example, when an upper limit constraint is 80% capacity, a virtual machine may be placed on the host when the addition of that virtual machine does not cause the recipient host to exceed 80% capacity.

The process of placing the virtual machine 510 may be performed using any type of packing algorithm, including worst-fit decreasing algorithms.

If the placement is successful in block 512, the placement may be added to the mapping in block 514 and the next virtual machine may be analyzed in block 508.

If the placement is unsuccessful in block 512, the loop may be exited in block 516 because the host cannot be consolidated. The changes for the current host may be removed from the mapping in block 518 and the process may end in block 524.

If all of the virtual machines were successfully placed in block 508, the host may be marked as turned off in the mapping in block 520. If more hosts are to be analyzed in block 522, the process may return to block 506 to select the next inefficient host. Otherwise, the process may end in block 524.

Figure 6:
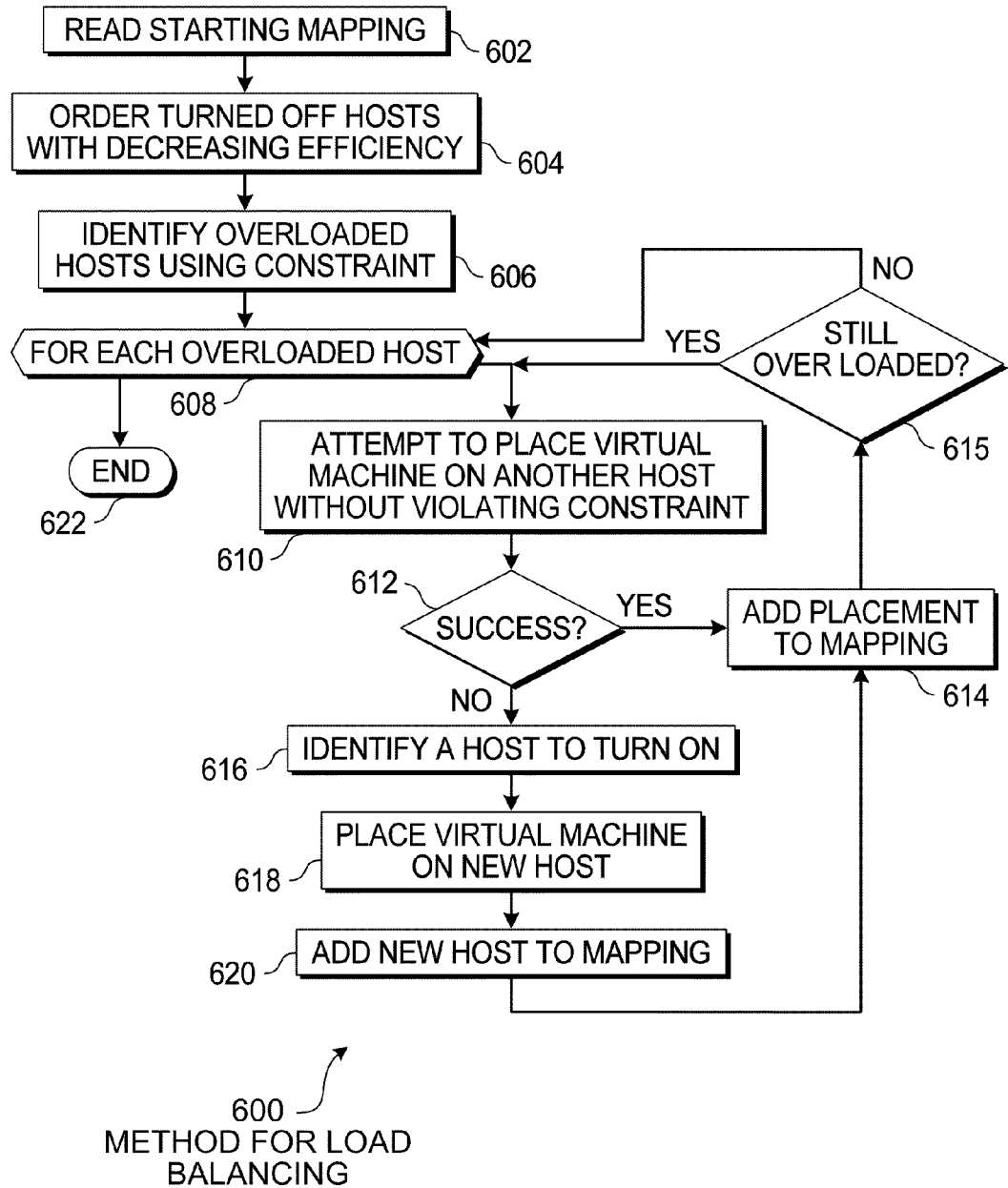
FIG. 6 is a flowchart illustration of an embodiment showing a method for load balancing.

FIG. 6 is a flowchart illustration of an embodiment 600 showing a method for load balancing. Embodiment 600 is a simplified example of a method that may be performed by blocks 210 of embodiment 200 and blocks 308 and 312 of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 attempts to place virtual machines from overloaded hosts to non-overloaded hosts. If no non-overloaded hosts exist, a new host may be turned on and may receive the virtual machine. The new host may be selected from the most efficient hosts available.

In block 602, a starting mapping may be read.

In block 604, the turned off hosts may be ordered with decreasing efficiency. The ordered list of turned off hosts in block 504 may be used to select new hosts that may be turned on. When a new host is selected, the most efficient host may be selected.

In block 606, overloaded hosts may be identified by the upper capacity limit defined for the operation. For example, if the upper capacity limit was 60%, those hosts with greater than 60% utilization may be selected.

Each of the overloaded hosts may be analyzed in block 608.

An attempt to place a virtual machine from the overloaded host may be made in block 610 without violating the upper capacity limit of other hosts. The placement may be made to any other host such that the receiving host does not violate the upper capacity limit.

If the placement is successful in block 612, the placement may be added to the mapping in block 614. If the current host is still overloaded in block 615, the process may return to block 610 to attempt to place another virtual machine. If the current host is no longer overloaded in block 615, the process may return to block 609 to process another overloaded host.

If the placement is not successful in block 612, a new host to turn on may be identified in block 616. The new host may be selected as the most efficient host that is not currently turned on from the list generated in block 604.

The virtual machine may be placed on the new host in block 618 and the new host may be added to the mapping in block 620. The placement of the virtual machine may be added to the mapping in block 614 and the process may continue.

When all of the overloaded hosts are processed in block 608, the process may end in block 622.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method of placing a plurality of virtual machines onto a plurality of host devices, said method comprising:

performing a first simulated consolidation using a first host capacity limit, said first simulated consolidation being performed by a method comprising:

identifying a first set of said host devices being powered on host devices and a second set of said host devices being powered off host devices, each of said powered on host devices hosting at least one of said plurality of virtual machines;

determining an efficiency for each of said plurality of host devices;

identifying at least one of first set of said host devices being an inefficient host;

identifying a set of virtual machines being those virtual machines operating on said at least one of said first set of said host devices;

placing said set of virtual machines on other members of said first set of host devices to create a first mapping, said placing being performed such that each of said host devices has a capacity less than said first host capacity;

performing a simulated load balancing operation using said first mapping to create a second mapping, said simulated load balancing comprising moving at least one virtual machine such that all of said host devices are below a second host capacity limit;

performing a second simulated consolidation using said second mapping to create a third mapping, said second simulated consolidation being performed using a third host capacity limit; and placing said plurality of virtual machines onto said plurality of host devices according to said third mapping.

2. The method of claim 1, said efficiency being a power efficiency.

3. The method of claim 2, said power efficiency being determined by dividing a consumed resource by power consumed.

4. The method of claim 3, said resource being CPU resource.

5. The method of claim 3, said resource being a storage resource.

6. The method of claim 3, said resource being a scarce resource.

7. The method of claim 1, said simulated load balancing comprising identifying a new host from said second set of host devices and moving at least one of said virtual machines to said new host.

8. The method of claim 7, said new host being an efficient host.

9. The method of claim 1, said first capacity limit being higher than said second capacity limit.

10. The method of claim 9, said second capacity limit being higher than said third capacity limit.

11. The method of claim 1, said first simulated consolidation being performed for at least two of said host devices.

12. A system for managing a plurality of host devices and a plurality of virtual machines operable on said plurality of host devices, said system comprising:

a data gatherer configured to determine data for each of said host devices and each of said virtual machines, said data comprising data that may be used to compute efficiency for each of said host devices;

an analysis engine configured to create a proposed mapping by performing a method comprising:

performing a first simulated consolidation using a first host capacity limit, said first simulated consolidation being performed by a method comprising:

identifying a first set of said host devices being powered on host devices and a second set of said host devices being powered off host devices, each of said powered on host devices hosting at least one of said plurality of virtual machines;

determining an efficiency for each of said plurality of host devices;

identifying at least one of first set of said host devices being an inefficient host;

identifying a set of virtual machines being those virtual machines operating on said at least one of said first set of said host devices; and placing said set of virtual machines on other members of said first set of host devices to create a first mapping, said placing being performed such that each of said host devices has a capacity less than said first host capacity;

performing a simulated load balancing operation using said first mapping to create a second mapping, said simulated load balancing comprising moving at least one virtual machine such that all of said host devices are below a second host capacity limit; and performing a second simulated consolidation using said second mapping to create said proposed mapping, said second simulated consolidation being performed using a third host capacity limit; and a virtual machine placement service configured to move at least a portion of said virtual machines to conform to said proposed mapping.

13. The system of claim 12, said performing a simulated load balancing being performed by a worst fit decreasing algorithm.

14. The system of claim 12, said analysis engine further configured to:
perform a plurality of mapping scenarios using said method;
scoring each of said plurality of mapping scenarios; and
selecting said proposed mapping from one of said plurality of mapping scenarios.

15. The system of claim 12, said efficiency being calculated using power costs for a host device, said power costs comprising power supply costs and cooling costs attributable to said host device.

16. The system of claim 12, said efficacy being calculated using a consumed resource.

17. The system of claim 16, said consumed resource being one of a group composed of:
CPU usage;
storage usage; and
network usage.

* * * * *

UNITED STATES PATENT AND TRADEMARK OFFICE
CERTIFICATE OF CORRECTION

PATENT NO. : 8,117,613 B2  
APPLICATION NO. : 12/420082  
DATED : February 14, 2012  
INVENTOR(S) : Uyeda Page 1 of 1

It is certified that error appears in the above-identified patent and that said Letters Patent is hereby corrected as shown below:

In the Claims

Column 18, line 12, Claim 16, delete "efficacy" and insert -- efficiency --, therefor.

Signed and Sealed this
Third Day of February, 2015

Michelle K. Lee
*Deputy Director of the United States Patent and Trademark Office*